Dec. 27, 1966     J. C. McKOWN     3,294,064
HUNTING PRESERVE AND GAME BIRD RELEASE THEREFOR
Filed June 29, 1965     4 Sheets-Sheet 1

John C. McKown
INVENTOR.

Dec. 27, 1966 J. C. McKOWN 3,294,064
HUNTING PRESERVE AND GAME BIRD RELEASE THEREFOR
Filed June 29, 1965 4 Sheets-Sheet 2

John C. McKown
INVENTOR.

BY *Clarence A. O'Brien*
*and Harvey B. Jacobson*
Attorneys

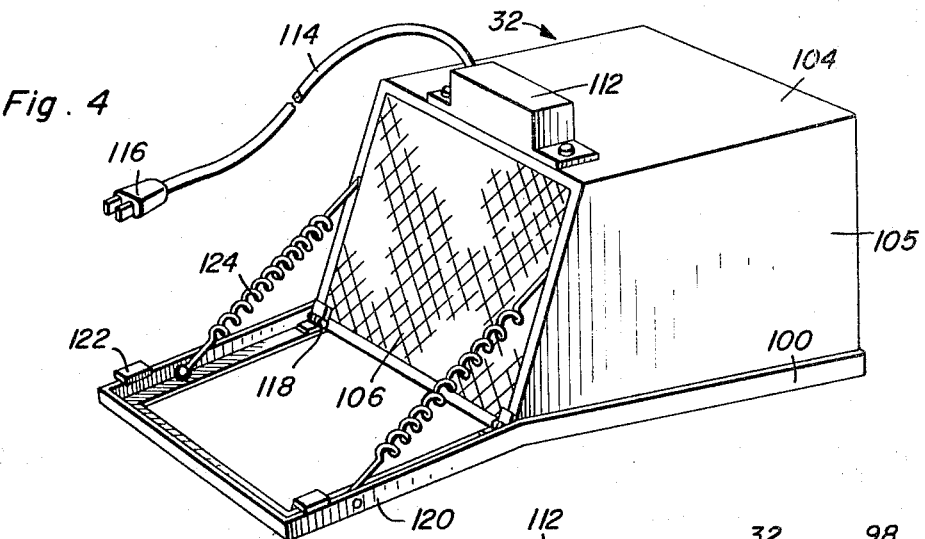
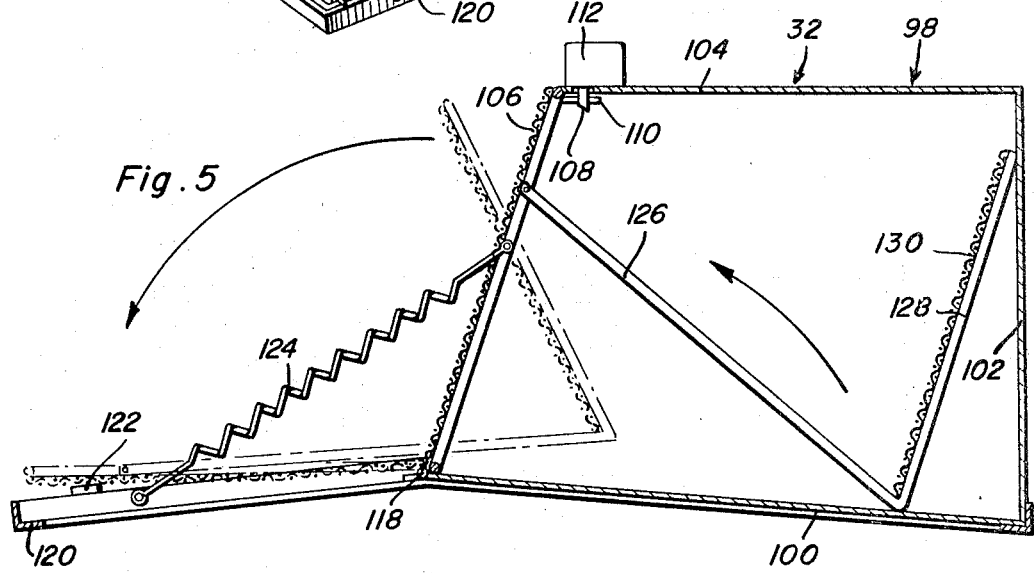
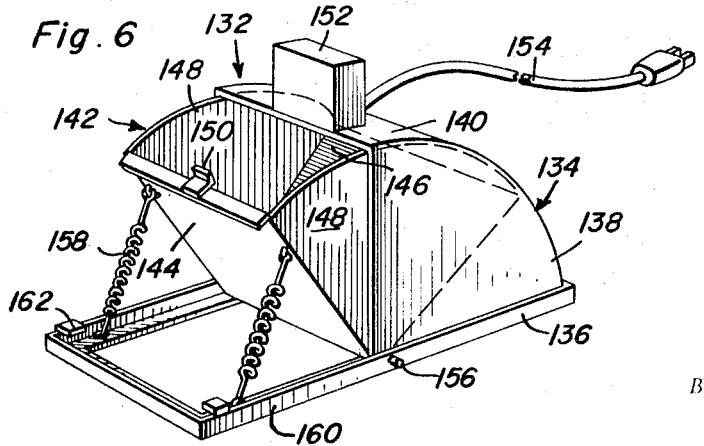
John C. McKown
INVENTOR.

Dec. 27, 1966    J. C. McKOWN    3,294,064
HUNTING PRESERVE AND GAME BIRD RELEASE THEREFOR

Filed June 29, 1965    4 Sheets-Sheet 4

John C. McKown
INVENTOR.

BY *Clarence A. O'Brien*
and *Harvey B. Jacobson*
Attorneys

United States Patent Office 3,294,064
Patented Dec. 27, 1966

3,294,064
HUNTING PRESERVE AND GAME BIRD
RELEASE THEREFOR
John C. McKown, P.O. Box G, Carterville, Ill. 62918
Filed June 29, 1965, Ser. No. 467,913
11 Claims. (Cl. 119—15.6)

The present invention generally relates to a hunting preserve incorporating a particularly novel layout to enable hunters to pursue their favorite sport in a relatively restricted area thereby rendering the hunting preserve practical on a relatively small land area.

For many years, there has been concern over the dwindling game bird population as compared with the increasing number of hunters. Some effort has been made to relieve the situation by providing public hunting land and in some instances, commerical shooting preserves have been employed. Present-day hunting birds of the commercial type usually requires that the operator raise his own game birds and release them on posted land and subsequently charge hunters so much per day or so much per bird to shoot. Such commerical hunting preserves have been rather widely developed but one of the objections thereto is the relatively expensive nature of such preserves and the fact that they reguire relatively large acreage. For example, presentday hunting preserves usually consist of several hundred acres of land and maintenance, ground preparation, fertilizing, seeding of cover areas and conditioning the preserve is quite expensive with such cost being directly reflected in the price a hunter pays for the game he shoots. The increased cost of game raising, increased land costs, increased labor costs and other increasing costs all are reflected in the high cost of operating present-day game preserves and such preserves are becoming over-priced for many hunters of modest means.

Accordingly, it is an object of the present invention to provide a hunting preserve requiring between 12 and 20 acres of land which will materially reduce the initial land cost, and also will materially reduce maintenance cost, labor cost and the like thus enabling a hunting preserve to be constructed and operated in a relatively inexpensive manner so that the cost of hunting game birds will be retained at a desired low level.

Another object of the present invention is to provide a hunting preserve covering approximately 12 acres and layed out in such a manner that from two to twenty hunters may use the preserve without endangering each other even though some of the hunters may be inexperienced and providing various persons regardless of their age, sex and the like with the pleasures of the sport of hunting game birds, such as pheasant, duck, quail, chukar and the like.

A further object of the present invention is to provide a hunting preserve employing game ejector traps which are remotely controlled with each unit being self-contained and located in any area where there is sufficient cover. By a predetermined signal, such ejectors release the bird in the air where they are either hit or missed by the hunter and ejection is carried out in such a manner that the hunter does not realize that the bird was ejected out of trap with the significant features of the ejector trap being that the bird does come out of the trap on the fly.

A further object of the present invention is to provide a game preserve having ejector traps for use with land-type game birds such as pheasant and quail as well as water-type game birds such as ducks.

Still another object of the present invention is to provide a game preserve having a service building associated therewith for the convenience of the hunters and for housing various ancillary equipment associated with the game preserve.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of one of the game ejectors;

FIGURE 5 is a sectional view of the construction of FIGURE 4 illustrating further structural details of the game ejector;

FIGURE 6 is a perspective view of a modified type of game ejector;

Figure 3:
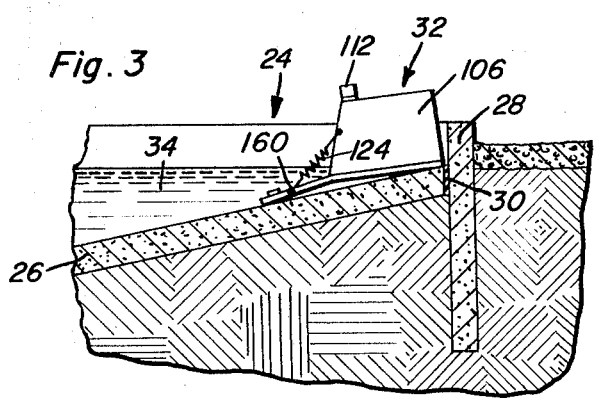
FIGURE 3 is a detailed sectional view illustrating a duck-type game ejector.

Referring now specifically to the drawings, the numeral 10 illustrates schematically the plan layout of the hunting preserve which is generally rectangular in configuration with the long side thereof being approximately 900 feet in length and the short side being approximately 600 feet in length. It is pointed out that the exact dimensions of the hunting preserve may vary and the above dimensions are given for exemplary purposes only with it also being pointed out that the topographical characteristics of the land area encompassed by the hunting preserve may vary. A fence 12 forms an enclosure for the hunting preserve and such fence may be of any suitable construction. Orientated peripherally of the hunting preserve is a plurality of lights 14 which may be located in a mutally spaced relation of 100 feet between the lights. The light may be orientated on suitable supporting poles or the like and generally illuminate the entire area of the periphery of the hunting preserve. A central walk-way 16 extends parallel to the long sides of the hunting preserve and generally bisects the hunting preserve and is provided with a plurality of lights 18 thereabove which shine outwardly toward the long sides and so as to further illuminate the hunting preserve so that the entire enclosed area of the hunting preserve will be illuminated for hunting at nighttime as well as during daylight hours. Pens 20 and 22 are provided at two of the corners of the hunting preserve for retaining the game birds and centrally of the hunting preserve is a duck pond 24 which includes a sloping bottom 26 illustrated in FIGURE 3 together with a peripheral wall 28 joined to the sloping bottom by a sealing material 30. A plurality of game ejector or duck release assemblies 32 are oriented around the periphery of the duck pond 24 which includes a quantity of water 34 which may be retained in a relatively clean condition by any suitable means.

Figure 1:
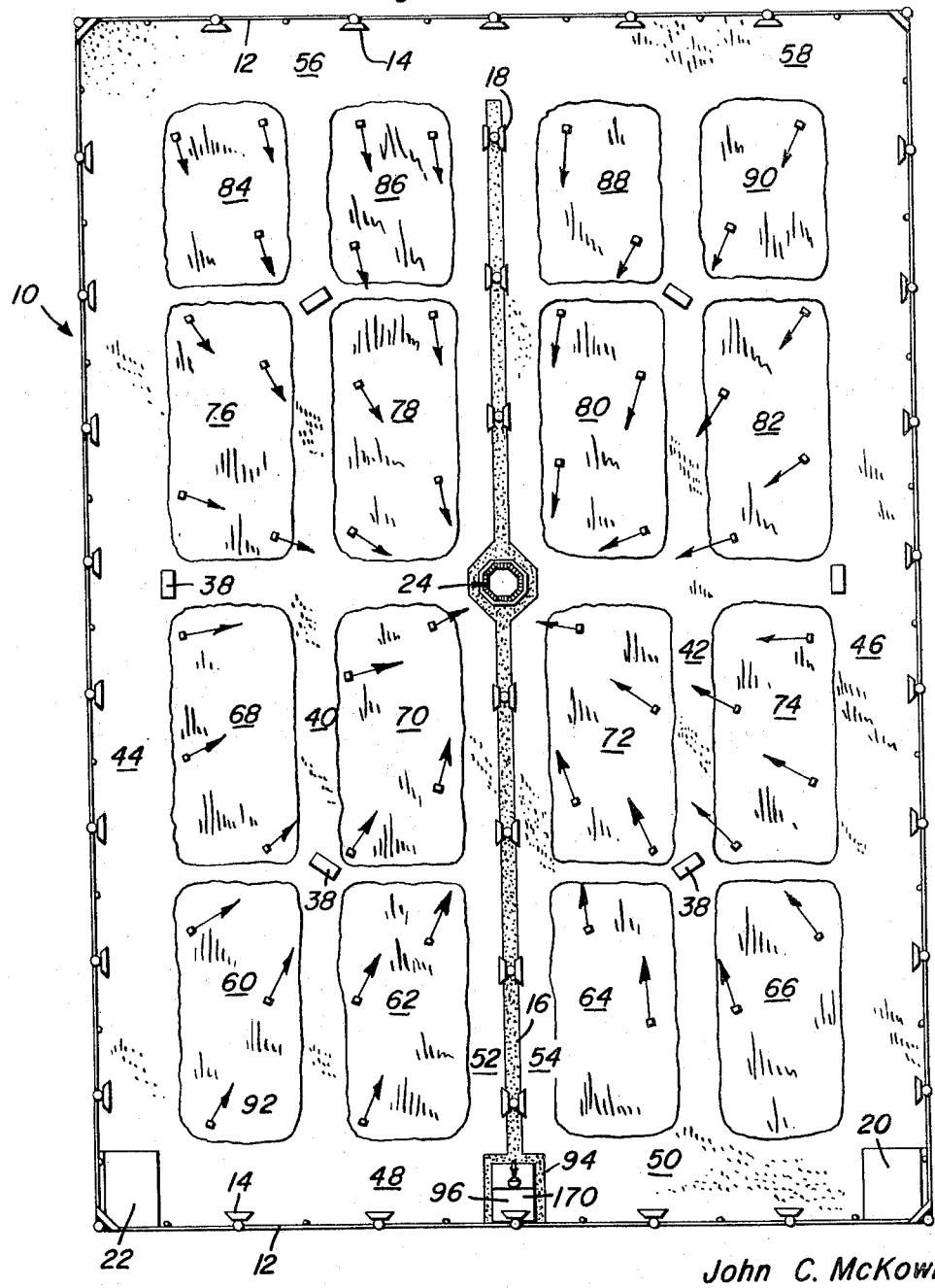
FIGURE 1 is a plan view of the hunting preserve of the present invention.
Figure 2:
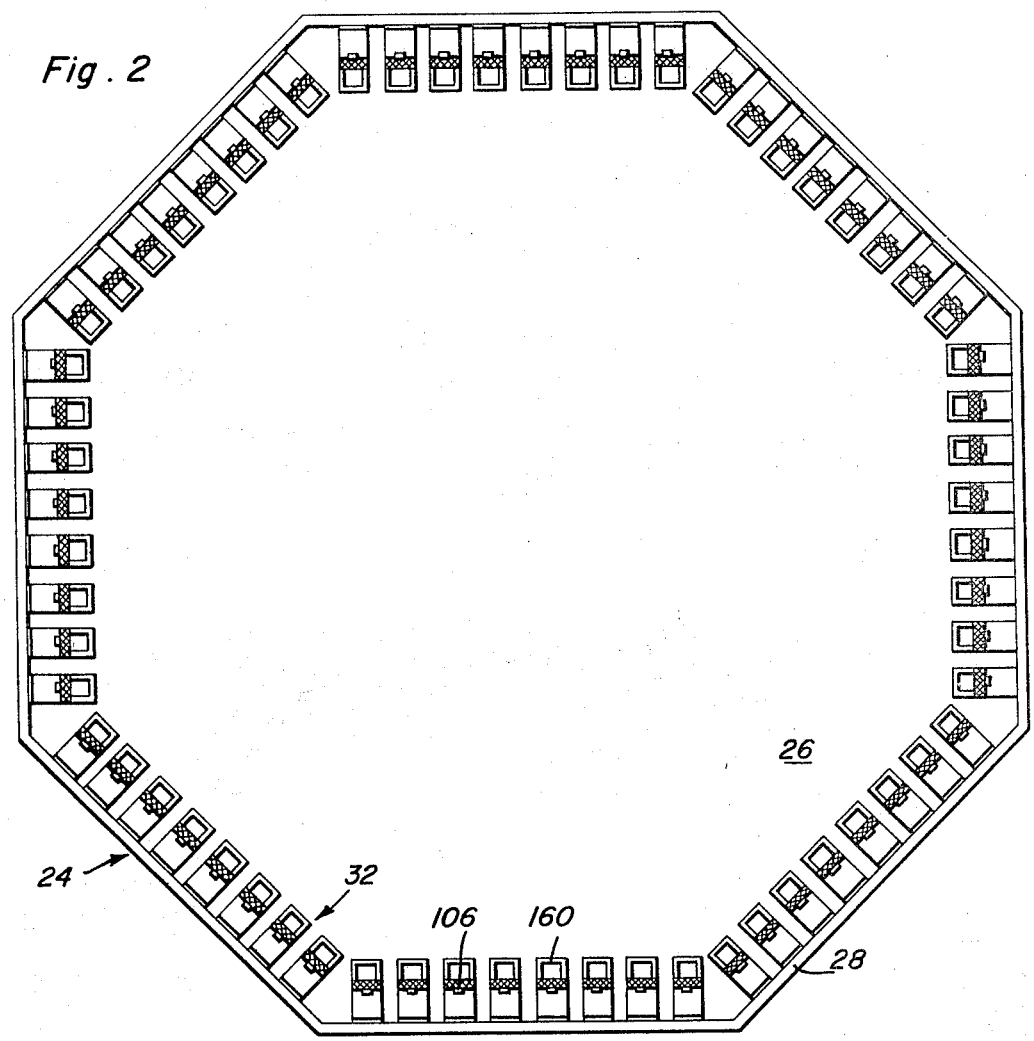
FIGURE 2 is a plan view of the blind arrangement orientated at the center of the preserve.

As illustrated in FIGURE 2, the duck pond 24 has forty-eight release traps 32 therein and orientated peripherally of the center of the duck pond 24 at a radius of approximately 250 feet, there is provided a plurality of duck blinds 38. As illustrated, there are six duck blinds 38 orientated about the center of the duck pond with the duck blinds being spaced equally around a generally circular area having a 250 feet radius. The construction of the duck blind is variable and may include various utility items for the convenience and comfort of the occupants of the blind.

Figure 7:
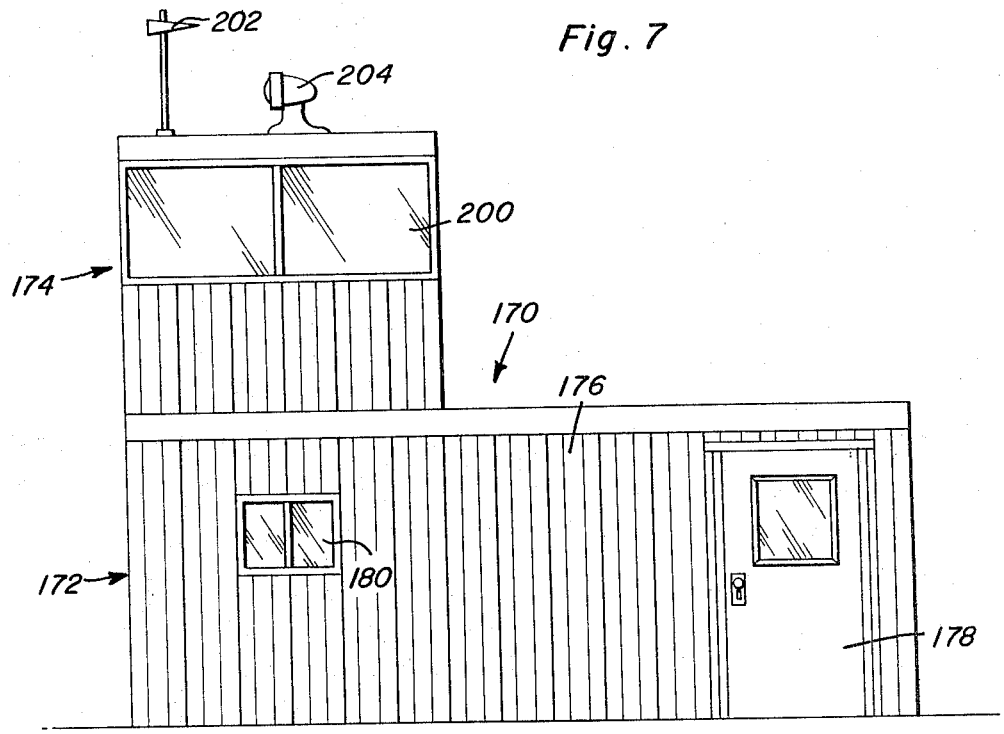
FIGURE 7 is an elevational view of a service building forming part of the game preserve.
Figure 8:
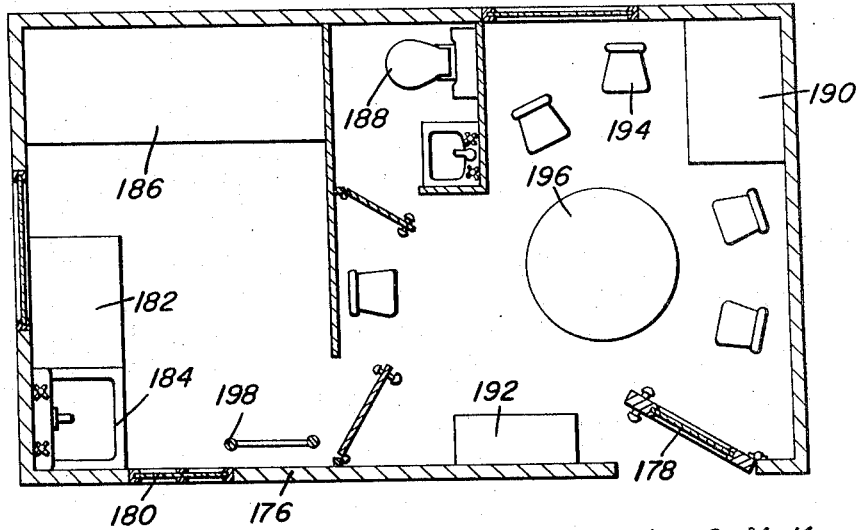
FIGURE 8 is a schematic plan view of the service building.

Disposed interiorly of the fence 12 are grass covered areas in which elongated area 40 is a pheasant area and the area 42 is a chukar and quail area. Grass areas 44, 46, 48, 50, 52, 54, 56, and 58 are all general purpose grass. Also, there are special areas 60, 62, 64, 66, 68, 70, 72, 74, 76, 78, 80, 82, 84, 86, 88 and 90 covered with Sudan grass each of which has a plurality of bird release ejectors designated by numeral 92 in the area 60 with the ejection of each bird release 92 being designated by an arrow. Thus, the birds are all released in a direction generally toward the center of the hunting preserve. Each of the Sudan grass areas is approximately 90 feet wide and the areas 84, 86, 88 and 90 are approximately 130 feet long while the areas 68–82 are approximately 205 feet long and the areas 60–66 are approximately 190 feet long. The width of the grass area 40 is approximately 30 feet while the width of the grass area 42 is also approximately 30 feet. The width of the grass areas 44 and 46 is approximately 60 feet and the grass areas 52 and 54 are approximately 27½ feet wide with the walk-way 16 being approximately 5 feet wide. At one end of the walk-away 16 there is a control area 94 having a control and service building 96 incorporated therein. The control area is approximately 60 feet wide and 60 feet long but the dimensions may vary depending upon the size of the control building 96, the details of which are illustrated in FIGURES 7 and 8.

FIGURES 4 and 5 illustrate the significant details of the game bird ejector and especially the pheasant and duck ejector and this structure includes a housing 98 having a bottom structure 100, a rear wall 102, a top wall 104, side walls 105 and an open front that is normally closed by a screen panel 106 which is secured in closed position by a locking element 108 projecting through an apertured keeper 110 connected to the screen panel 106. The locking element 108 is normally disposed in extended position for locking the screen panel 106 in closed position and is retracted by a door release mechanism 112 which may be a solenoid actuated construction that is remotely controlled by an extension cord 114 for plugging into a control line by the use of a male plug 116 on the end thereof. The extension cord 114 is preferably approximately 20 feet long so that the locational orientation of the game bird ejector 32 may be varied. When an operator closes an electrical circuit for energizing the door release mechanism 112, the solenoid mechanism retracts the lock member 108 or plunger thus releasing the screen closure 106 for swinging pivotal movement about hinges 118.

Forming an extension of the bottom or floor 110 is a front frame 120 of angle iron construction which includes lugs 122 on the upper edge thereof for limiting the forward pivotal movement of the closure screen 106 and a pair of tension springs 124 interconnect the frame 120 and the closure screen 106 for urging the closure screen 106 to its open position when it is released by energization of the solenoid release mechanism 112.

Attached to the side edges of the closure screen 106 adjacent the upper edge thereof is a pair of rods 126 having angulated extensions 128 thereon. The extensions 128 have a screen panel 130 secured thereto which serves as an ejector so that the pheasant or duck will be ejected from the cabinet 98 when the closure screen 106 is pivoted from its closed position to its open position as illustrated in dotted line in FIGURE 5. The panel 130 may be either a screen panel or a metal panel of sheet material with the movement of the panel 130 being generally in the form of a snap action to eject the bird from the cabinet 98 on the fly since the speed of the ejector panel 130 is such as to project the bird at a speed which will require him to leave the cabinet 98 on the fly.

The bottom of the assembly is provided with a higher point at the hinge area 118 as compared with the outer ends of the floor 100 and extension 120, respectively, to facilitate positioning of the device on the ground and to stabilize the device so that it will not rock during the ejection operation, thereby retaining the ejector in a fixed position. Also, the game bird ejector may be painted in any suitable manner, compatible with its surrounding grass areas and the like so that the game bird ejector will be substantially camouflaged.

FIGURE 6 discloses a modified form of game bird ejector generally designated by numeral 132 which includes a structure specifically adapted for use in releasing quail and chukar. This structure includes a housing 134, having a bottom frame 136 of angle iron construction and upstanding side walls 138 having an arcuate edge with a curved closure plate 140 extending therebetween. A pivotal compartment structure 142 is disposed interiorly of the case 134 when in a closed position and includes angularly disposed outer or front wall 144 and inner wall 146 and side walls 148 having arcuate top edges comparable to the curved wall 140 so that when the compartment 142 is received within the cabinet 134, the open upper end of the compartment 142 will be closed. The front wall 144 is provided with a keeper 150 for association with a solenoid operated release mechanism 152 controlled remotely by an electrical conductor 154 similar to the structure illustrated in FIGURES 4 and 5 so that when the release mechanism 152 is energized, the compartment 142 will be released for forward pivotal movement about a bottom pivot pin 156. Tension springs 158 extend between the frame 136 adjacent the outer end of the extension portion 160 thereof and the upper end portion of the front wall 144 to pivot the compartment 142 outwardly with the frame extension 160 having pads 162 thereon to limit the outward movement of the compartment 142. When the release mechanism 152 is energized, the compartment 142 will be released and the tensioned springs 158 will flip the compartment 142 outwardly thus releasing and ejecting the game bird therein. In this construction as well as in the other construction, the various components may be constructed of sheet metal, screen or the like and is camouflaged in a similar manner. In each instance, the pads 162 or 122 may be of resilient material to eliminate excessive noise being caused by release of a bird.

The construction of the ejectors is such that in each instance, the structure when it is open will be moved quickly and rapidly to its open position thus serving to eject the bird on the fly rather than merely enabling the bird to walk out which occurs when a trap door or the like is opened.

FIGURE 2 illustrates in more detail the particular construction of the duck pond which has a radius of generally 15 feet with each side of the octagonal pond being approximately 12 feet in length and provided with eight traps 32. The number of traps employed in the duck pond areas results from being able to shoot from one side of the duck blind areas only. This is due to wind velocities and the flight action of ducks. Birds released from the trap in one area of the pond will fly diagonally across the pond toward the duck blinds facing the particular trap area. The 250 feet radius of the blinds from the release traps will enable birds to gain natural flight speed before passing over the hunter's blind. Even if all blinds are occupied, the 500 feet distance between opposite blinds is more than adequate to prevent shooting accidents.

FIGURES 7 and 8 illustrate in more detail the control building designated generally by numeral 170 which includes a one story area 172 and a control tower 174 above the one story area 172. The first floor area 172 includes a peripheral wall 176 having an access door 178, windows 180 and the like together with the usual interior furnishings including a table 182, a sink 184, a deep freeze 186, bathroom facilities 188, a snack bar 190, a gun rack 192, chairs 194, a table 196 and the like all of which provide for the comfort of the hunters. A ladder 198 is provided for access to the control tower 174 which includes an enlarged glass area 200, a wind direction indicator 202 and a loudspeaker 204. The control tower is provided with a control panel for the various bird ejector traps and also a control panel for the lighting system. A hatch structure is provided for enabling access to the control tower by using the ladder 198. The specific structural materials employed in the building are variable and form no particular part of the invention and suitable means may be provided for heating, cooling or otherwise providing for the comfort and convenience of the hunters.

Low voltage system is employed to operate the electrical release solenoids attached to each ejector trap with the control panel being located in the control power. The perimeter and center strip lighting may be installed at the option of the operator of the hunting preserve to accommodate hunters who are busy during daylight hours thus enabling them to have the opportunity to pursue the sport during the evening hours.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hunting preserve comprising a fence enclosing a land area, a duck pond located centrally in said land area, a first plurality of bird retaining and releasing traps encircling said pond, and a plurality of duck blinds disposed in circumferentially spaced relation outwardly of said pond.

2. The hunting preserve as defined in claim 1 wherein said enclosed area is provided with peripheral and centrally disposed lighting means.

3. The hunting preserve as defined in claim 1 wherein said enclosed area occupies approximately 12 acres.

4. The hunting preserve as defined in claim 1 wherein said enclosed area includes a plurality of grass covered areas, and a second plurality of game bird retaining and releasing traps disposed in said grass areas.

5. The hunting preserve as defined in claim 4 wherein each of said game bird retaining and releasing traps includes a cabinet like enclosure, a closure member associated with said cabinet, remote control means for releasing the closure member, and means moving the closure member to an open position and ejecting a game bird therefrom.

6. The hunting preserve as defined in claim 5 wherein the closure members open toward the center of the enclosed land area thereby ejecting the game bird toward the center of the game preserve.

7. The hunting preserve as defined in claim 6 wherein the traps associated with the duck pond all open radially inwardly toward the duck pond for ejecting game birds radially toward the center of the duck pond.

8. The hunting preserve as defined in claim 7 wherein said enclosed area includes a service building having comfort areas and a control tower mounted thereon for controlling operation of the game bird retaining and releasing trap.

9. A game bird ejector comprising a cabinet-like structure having an open end, a substantially vertical pivotal closure member for closing said open end, spring means urging the closure member toward an outward open position, retaining means releasably retaining the closure member in closed position, and means connected to said closure member and movable therewith for ejecting a game bird from the cabinet when the closure member moves from its closed position to its open position with such means moving at a relatively rapid rate thereby ejecting a bird on the fly.

10. The structure as defined in claim 9 wherein said ejector includes an upwardly extending panel adjacent the rear of the cabinet structure, rods connected to the bottom of said panel and connected to the closure member in spaced relation to its pivotal connection for drawing the panel from the rear of the cabinet structure toward the front thereof for ejecting a bird or birds disposed in the cabinet structure.

11. The structure as defined in claim 9 wherein said ejector includes an inner wall and side walls having an arcuate configuration, said structure having an arcuate top wall conforming with the arcuate configuration of the side walls whereby the closure member and side walls serve to form a compartment to be pivoted about a lower corner for rapid opening movement for ejecting a game bird therefrom.

References Cited by the Examiner

UNITED STATES PATENTS

| | | | |
|---|---|---|---|
| 69,392 | 10/1867 | Blackmann | 119—50 |
| 480,130 | 8/1892 | Pease | 119—15.6 |
| 584,596 | 6/1897 | Mott | 119—15.6 |
| 2,642,036 | 6/1953 | Stuart | 119—15.6 |
| 3,027,871 | 4/1962 | Peterson | 119—45 |
| 3,063,412 | 11/1962 | Colsher et al. | 119—17 X |
| 3,157,156 | 11/1964 | Peterson et al. | 119—45 |

FOREIGN PATENTS 2,803　12/1893　Great Britain.

OTHER REFERENCES

An Illinois Guide to Preserve Shooting, Illinois Dept. of Conservation, 1957 edition, pages 20 and 21.

Modern Game Breeding (reprint), March 1960, "Shooting Preserves," pages 2 and 3.

SAMUEL KOREN, *Primary Examiner.*

ALDRICH F. MEDBERY, *Examiner.*